United States Patent Office 3,594,352
Patented July 20, 1971

3,594,352
POLYURETHANE ELASTOMER COMPOSITIONS PREPARED FROM POLYARYLPOLYISOCYA-NATES AND HIGH MOLECULAR WEIGHT POLYETHER POLYOLS
Rodney Frederick Lloyd and George Phillip Speranza, Austin, Tex., assignors to Jefferson Chemical Company, Inc., Houston, Tex.
No Drawing. Filed Oct. 1, 1968, Ser. No. 764,318
Int. Cl. C08g 22/06
U.S. Cl. 260—77.5                                              5 Claims

ABSTRACT OF THE DISCLOSURE

Polyurethane elastomer compositions are prepared by reacting in a one-shot process polyarylisocyanates having a functionality greater than 2.0 with polyether polyols having functionalities from 3 to 6 and molecular weight of about 5,000 to 13,000. The elastomer compositions are characterized by ambient temperature curing and physical properties of good elongation, tear strength, tensile strength and compression load deflection properties and low compression set values. These elastomers are useful as sealants, gaskets and surface coatings.

BACKGROUND OF THE INVENTION

Field of the invention

This invention relates to the preparation of solid polyurethane elastomers which cure at room temperatures and are useful as construction sealants, caulks, gaskets, joint sealants, coverings for floor and various other surfaces.

The prior art

In recent year polyurethane elastomer compositions have become increasingly attractive to those seeking improved materials for caulks, sealants, gaskets and floor coverings. It has been found that many polyether polyurethanes are adaptable for this purpose since they have been shown to have sufficient hardness, tensile strength, elongation, tear strength and load-bearing properties, together with algae, fungus and bacteria resistance for long service life, to make them highly attractive for these uses.

However, the materials thus far developed utilize such materials as diisocyanates, particularly toluene diisocyanate which is highly toxic and has a high vapor pressure at ambient temperatures. Toluene diisocyanate in particular causes a significant health hazard to those involved with its handling. The application of polyurethane products incorporating this material may be extremely hazardous without elaborate ventilation equipment. This is particularly true with respect to floor coverings wherein large surfaces of floor space are covered with these components.

In addition, the prior polyurethane plastics incorporated predominately diols as the polyether polyol and depended upon lower molecular weight polyols, particularly triols such as trimethylolpropane, glycerine, or 1,2,6-hexane triol as cross-linking agents to produce the elastomers. This added cross-linking was essential in order to provide load-bearing ability and to prevent excessive creep or cold flow of the materials.

In addition, these elastomeric materials were often viscous and had to be dissolved in a solvent for application. An alternate method of lowering the viscosity was by heating the components before mixing, thus requiring special heating equipment. This made on-site application of the sealants difficult and inconvenient. One method of preparing sealants for on-site use has been to make isocyanate-terminated polyether polyol adducts. Curing is accomplished by the reaction of the isocyanate groups in the composition with moisture in the atmosphere after application. This use of this type of material is described in more detail in U.S. Pats. 2,901,467 and 3,376,252. However, a coating composition which depends upon atmospheric moisture for curing could not be also used as a sealant for deep structural cavities where only a small portion of the surface of the polyurethane material itself is exposed to the atmospheric moisture, since curing would be slow and the sealant thickness would prevent gases generated during cure to diffuse to the surface of the polymer and would thus result in a foamed material having reduced strength.

Attempts to substitute high molecular weight polyether polyols for the low molecular weight diols resulted in a deterioration of the desired properties of the polyurethane elastomer composition, such as poor tensile and load-bearing properties and high creep, cold flow and compression set.

Previous investigations with polyurethane elastomers for gaskets, caulks and clay pipe sealants have similarly been directed to the use of toluene isocyanate component and low molecular weight diols in the presence of cross-linkers incorporated into the system.

All of these prior art systems have suffered from deficiencies involving the toxicity of the isocyanate component along with deficiencies of various of the physical properties of the resulting polyurethane elastomer composition.

Accordingly, it is the object of this invention to provide a polyurethane elastomer composition which will cure at ambient temperature without the necessity of being incorporated into a solvent. It is a further object of this invention to avoid the necessity of using highly toxic isocyanate materials in the preparation of useful polyurethane elastomer compositions. It is a further object of this invention to prepare polyurethane elastomer compositions, utilizing high molecular weight polyether polyols and, optionally, a cross-linking agent, which have good elongation, tear strength and tensile strength, with good load-bearing properties and low compression set values.

SUMMARY OF THE INVENTION

This invention relates to the preparation of solid polyurethane elastomer compositions which cure at ambient temperatures. These compositions are produced by the one-shot reaction of a polyphenylmethane polyisocyanate, or polyarylpolyisocyanate, having a functionality greater than 2.0, with polyether polyols having functionalities greater than 2 and average molecular weights of at least about 5,000.

It is more particularly directed to the production of these polyurethane elastomer compositions having incorporated therein sufficient quantities of a cross-linking agent, suitable fillers and coloring agents to produce the polyurethane elastomer compositions curing at ambient temperatures and having good tensile and tear strength, elongation and compression load deflection properties.

DISCUSSION OF THE INVENTION

While it has been previously thought that acceptable polyurethane coating compositions must be made utilizing toxic and highly-irritating toluene diisocyanate in either a one-component or a two-component coating system and that high molecular weight polyether polyols were not acceptable for such a use, the polyurethane elastomer compositions of our invention are one-shot reaction products prepared by mixing relatively non-irritating components which cure at ambient temperatures to produce sealant or coating compositions. Surprisingly, even though this great advantage has been achieved, it has been done without sacrificing physical properties of the resulting composition. In fact, the physical properties of the composition are improved so that they are successfully employed as caulks, sealants, gaskets and floor coverings. The physical properties of elongation, tear strength, compression load deflection and hardness result in such combination to provide an outstanding elastomer composition. This is especially true when the polyurethane composition of our invention is used as a surface coating. We have discovered that utilizing components which had not been heretofore used together produces polyurethane elastomer compositions having outstanding properties. The isocyanate component to be used in the polyurethane reaction in the practice of our invention is a polyarylpolyisocyanate having the structural formula:

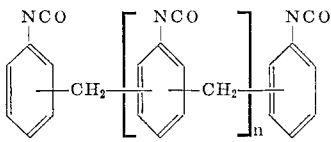

wherein $n$ has an average value greater than 0 to provide an average functionality of the polyarylpolyisocyanate of greater than 2.0. The upper limit of the functionality of the polymeric isocyanate is determined by the process by which it is made. It is preferred that the average functionality be in the range of 2.2 to about 4.0 ($n=0.2$–$2.0$). Even though higher functionality material may be used, as a practical matter functionalities of four or greater are quite rare and the average functionality of the material most readily available commercially varies between 2.2 and 3.3 ($n=0.2$–$1.3$). This is the especially preferred range to use to produce the polyurethane compositions of our invention.

While not being limited to the methods disclosed, polyarylpolyisocyanates used in the practice of our invention can be made as discussed in U.S. Pats. 3,344,162 and 3,362,979, for example.

The polyether polyols used in our invention are those having molecular weights of at least 5,000 and functionalities greater than 2. While functionalities of from 3 to 6 are acceptable, it is preferred that the functionality of the polyether polyol be 3 or 4. The general techniques for preparing the polyether polyols useful for practice of our invention are known to those skilled in the art.

Briefly, however, an initiator containing a plurality of active hydrogen atoms is reacted with an alkylene oxide in the presence of a basic catalyst. The initiator compound containing reactive hydrogen will fill two conditions initially:

(1) Its reactive hydrogen atoms will be sufficiently labile to open the epoxide ring of ethylene oxide or propylene oxide or butylene oxides, and (2) The reactive hydrogen compound will react with methylmagnesium hydride to liberate methane in the classical Zerewitinov reaction.

As indicated, the base-catalyzed reaction of alkylene oxides with polyhydric initiators is well known. Basic substances that may be used effectively include alkali metals, their hydrides, hydroxides, oxides, etc., and basic amines such as trimethylamine, diethylamine, etc.

Since the polyether polyols to be utilized in the preparation of our polyurethane elastomer compositions will have a molecular weight of at least 5,000, and sometimes about 13,000, it is normally desirable to add the alkylene oxide in stages. This first alkylene oxide to be added to the initiator may be ethylene oxide, propylene oxide, 1,2-butylene oxide, or mixtures thereof. Thus, the polyhydric initiator may be initially reacted with an alkylene oxide to provide an intermediate having a molecular weight of from about 300 to about 1,500. This intermediate may thereafter be reacted with additional quantity of alkylene oxide (which may be the same or different from the initial alkylene oxide) to build up to a higher molecular weight. This alkylene oxide addition sequence is continued until the desired molecular weight is reached. With respect to the polyether polyols to be used in the practice of the present invention wherein the polyols contain a high percentage (10–60%) of primary hydroxyl end groups, the final step is the base-catalyzed addition of ethylene oxide which may be added alone or in a mixture with a minor amount of (e.g., 5 to 40 wt. percent) of propylene oxide. The amount of ethylene oxide that is employed in the final alkoxylation step is such that this ethylene oxide will constitute about 5 to about 15 wt. percent of the total weight of the polyoxyethylene terminated polyether polyol.

Although theoretical considerations would suggest that the primary hydroxyl content of the final product would be proportional to the amount of ethylene oxide employed, such is not the case. Even in the absence of ethylene oxide the primary hydroxyl content of the conventional propylene oxide terminated triol is normally in excess of 1% and may be as much as 5%. However, with the addition of 5 to 15 wt. percent of ethylene oxide, a product is provided having a primary hydroxyl end group content of 10% to about 60%. With the use of about 5% of ethylene oxide, a product will be provided having a primary hydroxyl content of about 30% to 40%. With addition of 10% of added ethylene oxide, the primary hydroxyl content will normally be within the range of from about 40% to about 50% or 60%. However, even with about 15 wt. percent of ethylene oxide, primary hydroxyl content of more than about 60% is obtainable if at all only with great difficulty.

It is preferred that the polyether polyols used in the practice of our invention have a primary hydroxyl content of from 30% to about 60%, and especially preferred to have from 35% to 55% primary hydroxyl end groups.

As hereinbefore mentioned, the suitable polyether polyols having functionalities greater than 2 and molecular weights of at least 5,000 and generally from 5,000 to about 13,000 are prepared by reacting a polyhydric initiator with the alkylene oxides. Examples of the various polyhydric initiators useful to produce these polyether polyols are glycerine, trimethylolpropane, trimethylolethane, 1,2,6-hexane triol, methyl glucoside, pentaerythritol and sorbitol.

Also acceptable as initiators are polyether polyols having intermediate molecular weights. These materials are prepared by reacting a polyhydric initiator with one or more alkylene oxides as described above. The molecular weight of these polyether polyol intermediates may suitably be from about 260 to about 4,000, and particularly within the range of about 1,000 to about 3,500. The polyether polyol intermediate is then used as an initiator for the reaction with the alkylene oxides as hereinbefore mentioned to produce the polyether polyol useful in the practice of our invention.

While the critical upper limit of the molecular weight of the polyether polyol is not known, polyether polyols having molecular weights up to about 13,000 have been found suitable for the preparation of polyurethane elastomer compositions. However, it is preferred that the molecular weight range of the polyether polyols be from about 5,000 to about 8,000 and especially preferred that polyether polyol for the use in the practice of our invention be a polyether triol having from 20% to 60% primary hydroxyl content and a molecular weight of between 6,000 and about 7,000.

The use of such high molecular weight and high functionality polyether polyols is especially surprising in view of the teachings of previous investigators where in order to achieve acceptable physical properties of the polyurethane elastomer compositions, it was necessary to use polyoxyalkylene diols of substantially lower molecular weight. In doing so it was necessary often to resort to a prepolymer arrangement using a diisocyanate. While the investigators were able to make polyurethane elastomers from lower molecular weight polyols and the isocyanates earlier described, they did not known that the tear strength and elongation of polyurethane elastomers could be increased by increasing the molecular weight of the polyol without detrimentally decreasing the tensile strength of the resulting elastomer. However, we have discovered that high functionality, high molecular weight polyether polyols can be used in a one-short system with the previously described polyarylpolyisocyanate to produce polyurethane elastomers having not only outstanding physical characteristics but ambient temperature curing properties as well.

The tear strength is an especially important property when the urethane elastomer is used for molding articles, such as gaskets and seals. In addition, the increased elongation is especially important when considering polyurethane caulks and sealants, which are required to expand and compress with joint movement.

In addition to the isocyanate and polyol reactants, it is often advantageous, though not entirely necessary, to add to the reaction mixture a small amount of a polyhydric cross-linking agent. This material provides additional branching and therefore decreases elongation and increases tensile strength, modulus, hardness and compression strength of the final polyurethane elastomer composition. Variation of the cross-linker content adds versatility to the basic elastomeric material. While it may be incorporated in either the polyether polyol component, hereinafter called component B, or with the isocyanate component, hereinafter called component A, it is preferred practice of our invention to incorporate the cross-linking agent with component B. This is done to maintain the integrity of a one-shot system, for if added to component A, the hydroxyl groups on the crosslinking agent would react with the isocyanate groups of the polyarylpolyisocyanate to produce a prepolymer.

Cross-linking agents useful in the practice of our invention are trihydric alcohols such as trimethylolpropane, glycerine, 1,2,6-hexane triol, etc. Other cross-linking agents include low molecular weight (up to 500 M.W.) propylene oxide or ethylene oxide adducts of triols and tetrols such as trimethylolpropane, glycerine, pentaerythritol, etc. The amount of such cross-linking agents used is relatively small and varies from about 0.01 wt. percent to about 10 wt. percent of the component B, depending upon the properties desired in the final urethane elastomer. The preferred cross-linking agent for use in the practice of our invention is trimethylolpropane incorporated in amounts of about 0.20% to about 1% of the total polyurethane product.

Incorporation of inert fillers into polyurethane compositions increases the hardness and load-bearing characteristics of the elastomer. Many materials possess the inertness to reaction and biological attack to operate as satisfactory fillers for the sealant composition of our invention. These fillers can be finely divided silicas, volcanic clays, asbestos, alumino silicates, and the like. It is preferred that the fillers be calcined clays which do not interfere with the catalyst activity and possess the reinforcing characteristics desired. While even small amounts of filler improve the characteristics of the elastomer as hereinafter discussed, it is preferred that the filler be from about 20% wt. to about 50% wt. of the component B that goes to make up the polyurethane. As an amount of filler is increased, the Shore $A_2$ hardness, compression load deflection, tensile and tear strength are increased according to the amount of clay used. It would be expected that the elongation properties would decrease with increased filler loading. Therefore, it is necessary to determine the amount of clay filler to add by the physical properties desired in the final product.

This one-shot reaction is performed in the presence of a catalyst which is usually introduced into the reaction mixture in the B component and varies in the amount from about 0.01% to about 5% by weight of the total reaction mixture. Many such catalysts are described by and known to those skilled in the art. See for example U.S. Pat. 3,201,136 for many examples of suitable catalysts. Especially preferred catalysts are lead octoate (lead di-2-ethylhexoate), lead naphthenate, dibutylin dilaurate, tin octoates, phenylmercuric acetate and phenylmercuric propionate.

Another group of especially preferred catalysts for the practice of our invention is prepared by reacting stannic chloride, antimony chloride, or mixtures thereof, with ethylene glycol to form a complex and dissolving the complex in a 2,000 molecular weight polypropylene glycol. The production of this catalyst is described in U.S. Pat. application Ser. No. 494,856, filed Oct. 11, 1965 in the name of Peter B. Kelly, now abandoned. This mixture has been found to be an especially preferred catalyst in the polyurethane elastomers of our invention, for it allows adequate handling time to apply the elastomer to the surface to be coated or to pour it into molds and yet enables the elastomer to cure rapidly at room temperatures. This catalyst may be further modified by the addition of iron oxide to the B component. When the catalyst used is this latter catalyst modified by iron oxide, the catalyst is usually introduced as about 1.4 wt. percent to about 1.8 wt. percent of the total reaction mixture and the iron oxide is added from about 0.18 wt. percent to about 1 wt. percent based upon the weight of the B component.

In producing the polyurethane elastomer compositions of our invention, the A component and B component are combined such that the resulting mixture has a ratio of isocyanate groups in the A component to hydroxyl groups in the B component of about 0.9:1 to about 1.4:1. It is preferred that this ratio, the so-called isocyanate index, range from 1.0:1 to about 1.3:1 and especially it is preferred that the range vary between about 1.05:1 and about 1.25:1. It is within these ranges that the most desirable balance of advantageous physical properties and ambient temperature curing properties are achieved.

Thus, we have surprisingly achieved a polyurethane elastomer composition which even though the molecular weight of the polyol is greatly increased over those polyols known to be useful in the production of solid polyurethane elastomers, there is no significant sacrifice in the tensile strength as the tear strength and elongation properties of the elastomer are increased. This is especially significant in view of the belief that the strength of polyurethanes is dependent upon the interaction of the urethane linkages in the polymer chains, with the long polyether chains which connect these urethane linkage points adding the flexibility to the elastomers. Increasing the molecular weight of the polyether polyols by up to 7–8 times over that of conventional 1,000 and 2,000 molecular weight polyols often used for these applications does not give the expected very soft, low strength products having high elongation. Instead, the elastomers have good strength and hardness properties in addition to increased elongation. These points are illustrated in Table 1 which follows. It should be pointed out that for most sealant applications a tensile strength of above 400–500 p.s.i. is considered more than adequate. The improvement in the resistance to creep or cold flow as indicated by the experimentally determined compression set and the other load-bearing properties is illustrated in the examples hereinafter set out. The lower the value for compression set, the better the resistance to creep or cold flow.

TABLE 1.—PROPERTIES OF ELASTOMERS

| Polyarylpoly-isocyanate, value of $n$ | Polyol, M.W. | Shore $A_2$ Hardness | Tensile strength, p.s.i. | Elongation, percent | Tear, p.l.i. |
|---|---|---|---|---|---|
| 0.3 | 3,000 | 85 | 1,165 | 57 | 84 |
| 0.3 | 5,000 | 79 | 823 | 68 | 97 |
| 0.3 | 6,500 | 70 | 718 | 122 | 103 |
| 0.7 | 3,000 | 88 | 985 | 40 | 65 |
| 0.7 | 5,000 | 84 | 810 | 50 | 86 |
| 0.7 | 6,500 | 79 | 987 | 77 | 93 |
| 0.7 | 8,000 | 60 | 557 | 179 | 95 |

In the foregoing table, comparable formulations were used in all cases, with the only significant differences being the molecular weight of the polyols. These polyols were prepared by adding propylene oxide to trimethylolpropane and subsequently reacting sufficient ethylene oxide to give the polyol a primary hydroxyl content of 50% in each case.

As will be seen from the following examples, the reaction and curing of the polyurethane elastomer are carried out at room temperature or slightly above. The material that results is a polyurethane elastomer composition having outstanding physical properties for use as caulks, sealants, gaskets and surface coatings.

This invention will be described further by way of the following specific examples in which the details are given by way of illustration and not by way of limitation. All physical properties were determined using the relevant recognized ASTM methods.

EXAMPLE I

A polyurethane elastomer composition was prepared by combining a polyarylpolyisocyanate having an average functionality of 2.7 ($n=0.7$) with the following B component in a one-shot reaction mixture:

Component B

| | Parts by weight |
|---|---|
| Polyol [1] | 52.9 |
| Calcined clay | 43.6 |
| Iron oxide | 1.2 |
| Carbon black | 0.1 |
| Trimethylolpropane | 0.5 |
| Catalyst solution | 1.7 |

[1] 650 molecular weight polyether triol capped with ethylene oxide, 50% primary hydroxyl content.

Six hundred parts of component B was mixed with 45 parts of the polyarylpolyisocyanate (component A) having an average functionality of 2.7 ($n=0.7$). The mixture was quickly poured into suitable molds. Curing at 38° C. resulted in a gel time of 3.5 minutes, with the samples becoming tack free at 8.5 minutes. Testing after 48 hours showed a hardness of 79 (Shore $A_2$ Durometer) with a tensile strength of 987 p.s.i., a tear strength of 93 p.s.i. and an ultimate elongation of 77%. In a compression-deflection test, a 10% deflection of the test specimen was caused by a 249 lb./sq. in. load.

The catalyst solution used above was prepared by heating at 100° C. for 60 minutes under nitrogen, 256 parts of antimony trichloride and 324 parts of ethylene glycol. The mixture was then cooled to 75° C. and approximately 446 parts of stannic chloride added in small increments while maintaining the temperature below 100° C. After the addition was completed and fuming ceased, 1,000 grams of a polyoxypropylene glycol having an average molecular weight of 2,000 was added to the slurry. The entire mixture was then placed on a hot water bath and stirred with heating until clear. It was then subjected to pump vacuum at 100° C. until bubbling had essentially ceased. The product was a clear pale golden syrup. The catalyst thus prepared was then used to produce the polyurethane elastomer composition of this example.

The following polyurethane elastomers were produced in the same manner after Example I. Table 2 below shows the formulations and properties of the polyurethane elastomer.

TABLE 2

| Formulation (parts by weight): | | | |
|---|---|---|---|
| Component A: Polyarylpolyisocyanate ($n=0.3$–0.4) | 6.3 | 7.3 | 9.8 |
| Component B: | | | |
| Polyol of Example I | 49.6 | 49.0 | 46.9 |
| Trimethylolpropane | 0.43 | 0.43 | 0.41 |
| Bis(2 hydroxyethoxyphenyl)methane | | | 1.5 |
| Catalyst of Example I | 1.6 | 1.6 | 1.5 |
| Clay filler | 40.9 | 40.5 | 38.8 |
| Iron oxide | 1.1 | 1.1 | 1.0 |
| Carbon black | 0.1 | 0.1 | 0.1 |
| Elastomer properties: | | | |
| Gel time, min | 3.0 | 3.0 | 3.0 |
| Tack-free time, min | 15 | 15 | 15 |
| Hardness, Shore $A_2$: | | | |
| 15 min | 55–57 | 35–37 | 49–51 |
| 3 days | 72–73 | 75–76 | 76–77 |
| Tensile strength, p.s.i. | 770 | 900 | 1,070 |
| 100% modulus, p.s.i. | 735 | 832 | 1,065 |
| Ultimate elongation, percent | 116 | 124 | 110 |
| Tear strength, p.l.i. | 56 | 62 | 74 |
| CLD,[1] 10%, p.s.i. | 189 | 212 | 230 |
| Compression set (Method B),[2] percent | 6 | 7 | 9 |

[1] ASTM Test D575–46. [2] ASTM Test D395–61.

It will be noted from the above examples that the A component or isocyanate is only a small part of the formulation with respect to the total weight thereof. This accomplishes our objective of avoiding using the highly toxic toluene diisocyanate A component in formulations for polyurethane elastomers often used for the same purposes. The formulations of Examples II, III and IV were prepared and poured into molds, curing quickly at room temperature to tough durable products. These products are useful particularly as molded-in-place gaskets for the clay pipe industry.

EXAMPLE V

Using the same procedure described in Example I, 600 parts of component B from Example I were combined with 37 parts of a polyarylpolyisocyanate having a functionality of 2.3 ($n=0.3$). The resulting elastomer gelled in 4.25 minutes and was free of surface tack in 12 minutes. A hardness reading of 69–70 (Shore $A_2$ durometer) was observed after four days. The product had a tensile strength of 718 p.s.i. with an ultimate elongation of 122%.

EXAMPLE VI

Six hundred and twenty parts of component B polyol blend as described in Example I, except the polyol was an ethylene oxide capped sorbitol initiated hexol, having approximately 13,000 molecular weight and a primary hydroxyl content of 50%, was mixed with 40 parts of a polyarylpolyisocyanate ($n=0.7$) and gave a polyurethane composition which gelled in 3.25 minutes and had a hardness (Shore $A_2$) of 78–80 after 3 days. Other properties were 618 p.s.i. tensile strength, 56 p.l.i. tear strength and 325 p.s.i. compression load deflection (10%).

EXAMPLE VII

Six hundred and twenty parts component B polyol blend as described in Example I, except the polyol was an ethylene oxide capped (50% primary hydroxyl) polyoxypropylene triol of approximately 5,000 molecular weight, was mixed with 46 parts of polyarylpolyisocyanate ($n=0.6$) to give a urethane reaction mixture which gelled in 4.5 minutes and attained a hardness (Shore $A_2$) of 71 after 24 hours. Other properties were 641 p.s.i. tensile strength, 91% ultimate elongation, 84 p.l.i. tear strength and 200 p.s.i. compression load deflection (10%).

EXAMPLE VIII

A polyol blend was prepared in the following ratio:

Component B

| | Parts by weight |
|---|---|
| Polyol | 52.9 |
| Calcined clay | 43.7 |
| Iron oxide | 1.2 |
| Carbon black | 0.1 |
| Trimethylolpropane | 0.4 |
| Catalyst solution (Ex. 1) | 1.7 |

The polyol used in this example was an ethylene oxide terminated (50% primary hydroxyl) polyolxpropylene triol of approximately 8,000 molecular weight, where trimethylolpropane served as the initiator. The catalyst solution was the same as described in Example I. Mixing 640 parts of component B with 35 parts of polyarylpolyisocyanate ($n=0.7$) gave a urethane reaction mixture which gelled in 4.5 minutes and obtained a hardness of 59–60 after four days. This elastomer had 557 p.s.i. tensile strength, 179% ultimate elongation, 95 p.l.i. tear strength, 101 p.s.i. compression load deflection (10%) and a 100% modulus of 430 p.s.i.

EXAMPLE IX

This example illustrates the use of a prior art 3,000 molecular weight triol. The component B mixture was prepared as in Example I where the polyol was an ethylene oxide terminated (50% primary hydroxyl) polyoxypropylene triol of 3,000 molecular weight. Mixing 600 parts of this component B with 68 parts of polyarylpolyisocyanate ($n=0.7$–$0.8$) produced a urethane reaction mixture which gelled in 2.25 minutes and was free of surface tack after four minutes. After four days this elastomer had attained a hardness (Shore $A_2$) of 86–88. Other properties were 985 p.s.i. tensile strength, 40% ultimate elongation, 65 p.l.i. tear strength and 416 p.s.i. compression load deflection (10%). The high hardness and low elongation of this material prohibits its use as structural sealant or caulk where joint movement requires the sealant to have flexibility and to move with the joint.

EXAMPLE X

A polyol blend was prepared in the following ratio:

Component B

| | Parts by weight |
|---|---|
| Polyol (Ex. VII) | 52.9 |
| Clay, calcined | 43.6 |
| Iron oxide | 1.2 |
| Carbon black | 0.1 |
| Trimethylolpropane | 0.57 |
| Catalyst solution (Ex. 1) | 1.7 |

Mixing 600 parts of the component B with 51.5 parts of a polyarylpolyisocyanate ($n=0.3$) gave a mixture which gelled in 3.75 minutes at 38° C. and attained a final Shore $A_2$ hardness 78–79 after five days. Other properties were: tensile strength 823 p.s.i., elongation 68%, tear strength 97 p.l.i. and 10% compression load deflection 238 p.s.i.

EXAMPLE XI

Six hundred parts of component B, Example X, was mixed with 53 parts of a polyarylpolyisocyanate ($n=0.7$). The mixture gelled in 4.5 minutes. After 15 minutes the polymer had attained a Shore $A_2$ hardness of 60–61. The properties after five days were: Shore $A_2$ hardness 83–84, tensile strength 810, elongation 50%, tear strength 86 p.l.i. and 10% compression load deflection 295 p.s.i. Elastomers with these properties are well-suited for use as flooring materials.

EXAMPLE XII

A component B polyol blend was prepared in the following ratio:

Component B

| | Parts by weight |
|---|---|
| Polyol (Ex. I) | 53.6 |
| Clay, calcined | 44.3 |
| Iron oxide | 1.2 |
| Carbon black | 0.15 |
| Trimethylolpropane | 0.47 |
| Phenylmercuric acetate | 0.26 |

Mixing 620 parts of component B with 32 parts of polyarylpolyisocyanate ($n=0.7$) gave a mixture which gelled in about six minutes and attained a Shore $A_2$ hardness of 72–73 after two days. This elastomer had these properties: tensile strength 738 p.s.i., elongation 103%, tear strength 62 p.l.i. and 10% compression load deflection 192 p.s.i.

EXAMPLE XIII

This example illustrates the use of three different catalysts for use in preparing elastomers from high molecular weight polyols and polyarylisocyanates. The following polyol blend was prepared:

Component B

| | Parts by weight |
|---|---|
| Polyol (Ex. I) | 58.7 |
| Clay, calcined | 39.6 |
| Iron oxide | 1.1 |
| Carbon black | 0.1 |
| Trimethylolpropane | 0.51 |

The component B was divided into 600 gram portions for reacting with polyarylpolyisocyanate in the presence of the catalysts indicated in Table 2. The amounts of the catalysts are shown in weight percent basis total formulation. The polyarylisocyanate used ($n=0.3$) was mixed with the component B and catalyst so that the isocyanate to hydroxyl ratio was 1.15 to 1.00 in each case. As the table indicates, the working time and final hardness and tensile strength are good for each of the three catalysts.

TABLE 2

| Formulation | (3617-4) a | (3617-5) b | (3617-3) c |
|---|---|---|---|
| Catalyst, wt. percent: | | | |
| Dibutyl tin dilaurate | 0.25 | | |
| Lead octoate (24%) | | 1.0 | |
| Catalyst from Example I | | | 1.8 |
| Gel time, min. | 2.5 | 4.5 | 3.3 |
| Hardness, Shore $A_2$ | 63–65 | 66–67 | 63–64 |
| Tensile strength, p.s.i. | 545 | 628 | 655 |
| Elongation, percent | 88 | 99 | 140 |
| 10% compression load deflection, p.s.i. | 156 | 162 | 132 |

By the foregoing discussion and examples, an improved polyurethane elastomer composition is taught that has good elongation, hardness and load-bearing properties. One skilled in the art considering these teachings would be able to make many obvious variations and modifications of this invention. These modifications and variations are considered to be within the scope of our invention and the following claims.

What is claimed is:

1. A polyurethane elastomer prepared by simultaneously mixing and reacting, in the presence of a catalyst, a polyarylpolyisocyanate defined by the structure

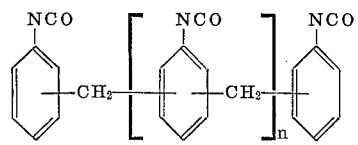

where $n$ has an average value greater than zero, a polyhydric cross-linking agent and polyether polyol having a molecular weight of from about 5,000 to about 13,000, a functionality greater than two and a primary hydroxyl content of from 10% to 60% wherein the reactants are present in amount such that the isocyanate index is from about 0.9 to about 1.4.

2. An improved polyurethane elastomer prepared by simultaneously mixing and reacting in the presence of a catalytic amount of a polyurethane catalyst, a polyarylpolyisocyanate-containing A component and a polyether polyol-containing B component in proportions such that the ratio of isocyanate groups to hydroxyl groups present in the reaction mixture is from 0.9 to about 1.4; wherein the A component is a polyarylpolyisocyanate defined by the structure

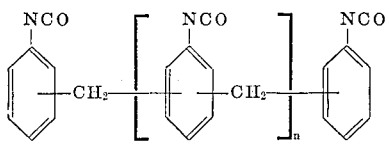

where $n$ has an average value greater than zero and the B component contains a polyhydric cross-linking agent and a polyether polyol having a functionality of from three to about six and a molecular weight of from 5,000 to about 13,000 with a primary hydroxyl content of from 10% to 60%.

3. The improved polyurethane elastomer composition of claim 2 wherein $n$ has a value of about 0.2 to about 2.0 and the B component contains therein a filler and the cross-linking agent is a trihydric alcohol.

4. The polyurethane elastomer composition of claim 2 wherein $n$ has a value of 0.2 to about 1.3 and the polyether polyol has a molecular weight of from about 5,000 to about 8,000 and a primary hydroxyl content of about 20% to 60%.

5. The polyurethane elastomer composition of claim 4 wherein the polyether polyol has a primary hydroxyl content of 35% to about 55%, a molecular weight of 6,000 to 7,000 and a functionality of three.

References Cited

UNITED STATES PATENTS

| 2,929,800 | 3/1960 | Hill | 260—77.5 |
| 3,450,653 | 6/1969 | McClellan | 260—18 |

DONALD E. CZAJA, Primary Examiner

M. J. WELSH, Assistant Examiner

U.S. Cl. X.R.

260—18, 37, 47

UNITED STATES PATENT OFFICE

CERTIFICATE OF CORRECTION

Patent No. 3,594,352                      Dated July 20, 1971

Rodney Frederick Lloyd and George Phillip Speranza
Assignors to Jefferson Chemical Company, Inc.
Houston, Texas, a corporation of Delaware It is certified that errors appear in the above-identified patent and that Letters Patent are hereby corrected as shown below:

In column 1, line 18, "weight" should read -- weights --; in column 1, line 33, "floor" should read -- floors --; in column 1, line 36, "year" should read -- years --. In column 5, line 11, "known" should read -- know --; in column 5, line 17, "one-short" should read -- one-shot --. In column 7, line 44, "650" should read -- 6500 --; in column 7, line 53, "p.s.i.", second occurrence, should read -- p.l.i. --. In Table 2, column 8, headings should be inserted -- EXAMPLE --, -- II --, -- III --, -- IV --.

Signed and sealed this 22nd day of February 1972.

(SEAL)
Attest:

EDWARD M. FLETCHER, JR.           ROBERT GOTTSCHALK
Attesting Officer                     Commissioner of Patents